US005843486A

United States Patent [19]

Kurosaki et al.

[11] Patent Number: 5,843,486

[45] Date of Patent: Dec. 1, 1998

[54] POLYMER INJECTION MOLDING UNIT

[75] Inventors: Yasuo Kurosaki, No. 14-18, Hiyoshi 1-chome, Kouhoku-ku, Yokohama-shi, Kanagawa-ken, Japan, 223-0061; Isao Sato, Tokyo, Japan

[73] Assignees: Yasuo Kurosaki, Kanagawa-Ken; Rexroth Co., Ltd., Tokyo, both of Japan

[21] Appl. No.: 673,169

[22] Filed: Jun. 26, 1996

[51] Int. Cl.[6] .................................................... B29C 35/08

[52] U.S. Cl. ......................... 425/174; 249/134; 264/402; 264/492; 425/174.4

[58] Field of Search ................................ 425/174.4, 174, 425/174.2; 264/402, 410, 492, 22, 23, 25; 249/134

[56] References Cited

U.S. PATENT DOCUMENTS

| | | | |
|---|---|---|---|
| 4,287,931 | 9/1981 | Vogt | 264/492 |
| 4,652,721 | 3/1987 | Miller et al. | 219/121 LG |
| 5,078,947 | 1/1992 | Nishizawa et al. | 264/1.1 |
| 5,219,497 | 6/1993 | Blum | 264/1.4 |
| 5,365,345 | 11/1994 | Propst et al. | 359/359 |
| 5,456,866 | 10/1995 | Kanome et al. | 425/810 |

OTHER PUBLICATIONS

Mold–Making Handbook by Stockhart Chapter 11 p. 253 1983.

*Primary Examiner*—Jay H. Woo
*Assistant Examiner*—Ivrie Schwartz
*Attorney, Agent, or Firm*—Darby & Darby

[57] ABSTRACT

A polymer injection molding unit is disclosed having a mold wall which includes a portion made of an infrared transmissible material which is radiated by an external infrared radiation source. Due to the passage of the infrared radiation through the infrared transmissible material, the infrared radiation is not absorbed by the mold wall and the mold wall is not substantially heated. The infrared radiation passes through the mold wall and is absorbed by the molten polymer material near the mold wall. As a result, the temperature of the molten polymer material rises and its viscosity is lowered to thereby enhance the shape transcription of complicated or fine shapes present on the mold wall, without increasing the temperature of the mold wall.

3 Claims, 7 Drawing Sheets

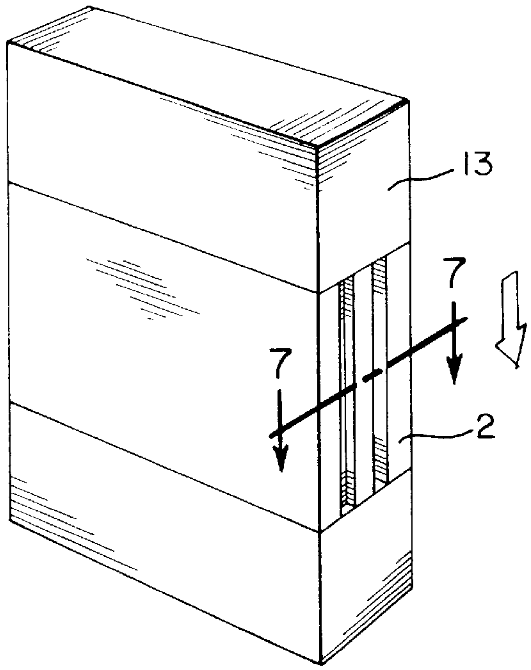
FIG. 6
FIG. 10
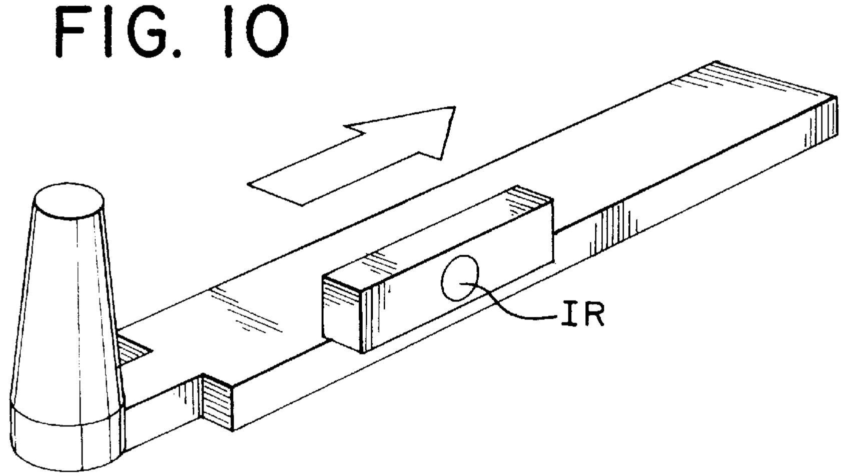
FIG. 11
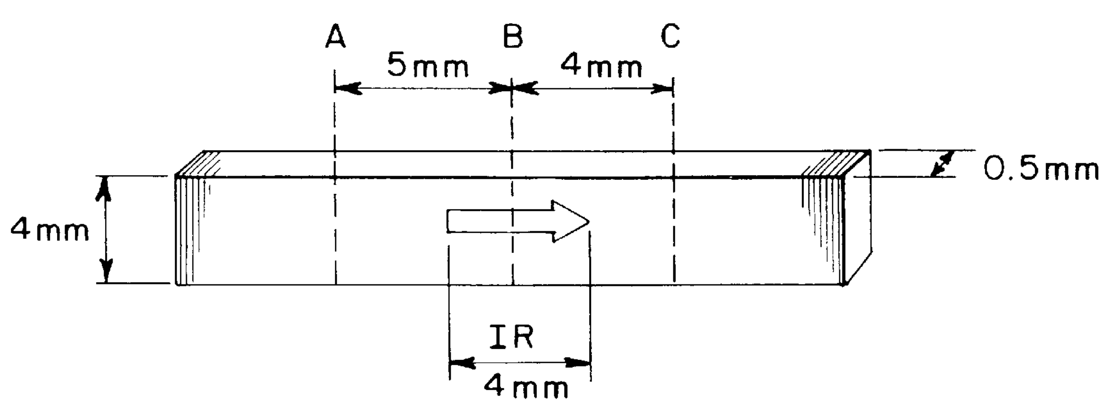

POLYMER INJECTION MOLDING UNIT

BACKGROUND OF THE INVENTION

The present invention relates to a polymer injection molding unit, and more particularly relates to an improvement in optical quality and transcribability of mold surface nature onto the molded product in polymer injection molding well suited for production of precise devices, electronic recording media and optical parts.

In this specification, the term "a low transcription area" refers to a specified area on a mold wall which is unsuited for precise transcription of shapes. Generally, such an area includes collected and fine projections, depressions and their combinations and such shapes on the mold wall can hardly be transcribed onto a corresponding shaped mold product precisely.

In the process of polymer injection molding, polymer resin material is molten by heating for plasticization, and molten polymer material at a high temperature is injected into a mold cavity at a high speed. Thereafter the molten polymer material is cooled for solidification in order to produce a mold product of an intended design. This process is widely employed in production of shaped resin products because of its significantly high productivity when compared with production via press shaping.

This process, however, inevitably suffers from the trouble of residual stress and strain in the shaped resin products because of the viscoelastic nature of the polymer material, concurrent advance of fluidization and cooling of the polymer material and uneven cooling caused by low thermal conductivity of the polymer material. As a result, the shaped resin products unavoidably includes intolerable extent of visible external defects such as warps, sinks, short shots (insufficient injection) and weld lines (insufficient fusion during solidification).

Around the area in the mold cavity remote from the injection port, molten polymer material of a high temperature comes into abrupt contact with a mold wall of a low temperature to rise its viscosity and such high viscosity seriously lowers the shape transcribability of the molten polymer material. Stated otherwise, the shape of such a mold wall can hardly be transcribed onto a corresponding shaped mold product with complete fidelity. Thus, in production of an electronic recording media having sections with juxtaposed fine grooves (or projections) for example, such grooves or projections cannot be precisely reproduced on the shaped mold product.

Such abrupt contact of the high temperature molten polymer material with the low temperature mold wall tends to form adjacent layers of different viscosities which generate shearing stress at their border. Such shearing stress develops an orientation layer in which polymer moleculars of the resin material are highly oriented. Presence of such molecular orientation layer is unavoidably associated with local change in birefringence and refractive index, thereby causing deviation in optical property. So, when the shaped mold product is used for optical purposes, there is experienced serious invisible internal defects.

In order to evade generation of such external and internal defects, it is thinkable to lower the cooling speed of molten polymer material, rise the temperature of the molten polymer material or increase the injection pressure.

Lowering of cooling speed can be practiced by slowly cooling the molten polymer material or by rising the temperature of the mold wall. These expedients, however, impairs the high grade productivity of the polymer injection molding process which is the largest advantage of the process over the press shaping process. It is no longer expected to produce a great number of shaped mold products within a short production time. This is thus the fatal drawback of this expedient.

Regarding rise in temperature of the molten polymer, it was confirmed by the inventors of the present invention that such an expedient results in no appreciable merits in real production of shaped mold products.

It was also confirmed by the inventors in their research activities that rise in injection pressure cannot assure any appreciable success in lowering of the cooling speed.

SUMMARY OF THE INVENTION

It is thus the basic object of the present invention to improve shape transcribability in polymer injection molding without any malign inferences on its high productivity.

It is another object of the present invention to improve optical quality of the molded products and to enable production of shaped resin mold products well suited for precise devices, electronic recording media and optical parts bearing precisely transcribed intended shapes.

In accordance with the basic concept of the present invention, at least one low transcription area of a mold wall is made of an infrared transmissible material and an infrared radiation source is arranged to radiate the low transcription area during polymer injection molding.

BRIEF DESCRIPTION OF THE DRAWINGS

FIG. 6 is an enlarged perspective view of the main part of an experimental arrangement used for confirmation of shape transcribability under various conditions of polymer injection molding, FIG. 10 is a simplified perspective of an experimental arrangement used for investigation of distribution of residual birefringence, FIG. 11 is a perspective view of the main part of the arrangement shown in FIG. 10.

DESCRIPTION OF THE PREFERRED EMBODIMENT

In accordance with the above-described basic concept of the present invention, at least one low transcription area of a mold wall is made of an infrared transmissible material and an infrared radiation source is arranged to radiate the low transcription area during polymer injection molding. During infrared radiation, molten polymer material near the low transcription area of the mold wall rises in temperature due to absorption of infrared energy to lower its viscosity. Whereas, no rise in temperature occurs in the mold wall thanks to simple transmission of infrared beams accompanying no substantial energy absorption.

Figure 1:
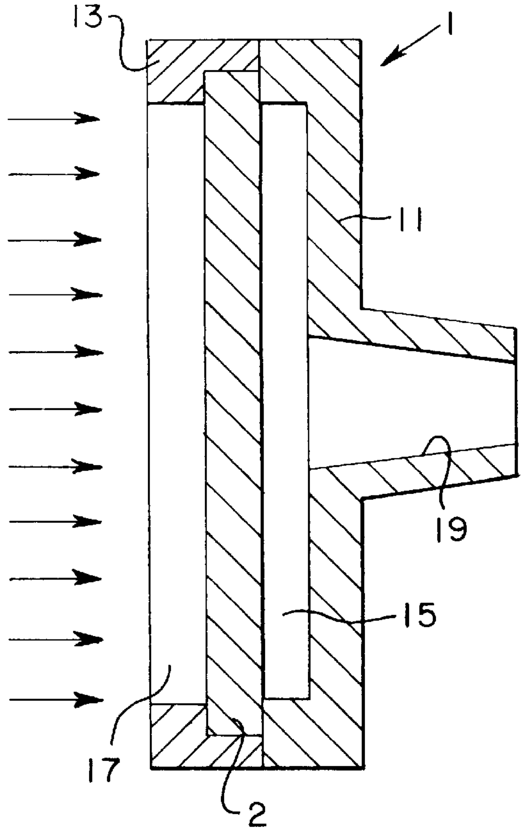
FIG. 1 is a sectional side view of one embodiment of the molding unit in accordance with the present invention.

One embodiment of the molding unit in accordance with the present invention is shown in FIG. 1, in which the entire area of a mold cavity is subjected to infrared radiation. A separable mold 1 is made up of a pair of mold halves 11 and 13 which defines a mold cavity 15 when coupled to each other. The first mold half 11 is provided with an injection port 19 whereas the second mold half 13 is provided with a window 17 which spans the entire transverse cross sectional area of the mold cavity 15. An infrared transmissible panel 2 is held by the mold halves 11, 13 in an arrangement to extend transverse the entire area of the mold cavity 15. The mold 1 is associated with a proper infrared radiation source (not shown) arranged to radiate the entire area of the infrared transmissible panel 2 as shown with arrows 17 in the drawing.

A $CO_2$ gas laser, a YAG laser or an infrared lamp is generally used for the infrared radiation source. The frequencies of the infrared beams to be radiated are selected from a range suited for absorption by polymers composing polymer resin material in consideration of real process conditions.

The infrared transmissible panel 2 is made of, for example, zinc selenide (ZnSe), sapphire and infrared glass.

Figure 2:
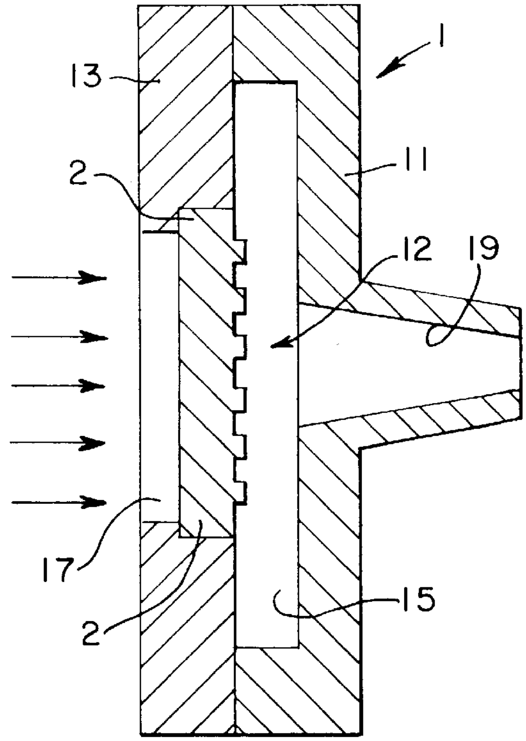
FIG. 2 is a sectional side view of another embodiment of the molding unit in accordance with the present invention.

Another embodiment of the molding unit in accordance with the present invention is shown in FIG. 2, in which only a specified area of the mold cavity is subjected to infrared radiation. In this case, only a low transcription area 12 of the mold wall is occupied by the infrared transmissible panel 2 and the window 17 is designed to direct infrared radiation to the panel 2 only. As clearly shown, the infrared transmissible panel 2 is provided a lot of juxtaposed fine projections and depressions on the surface facing the mold cavity 15.

Figure 3:
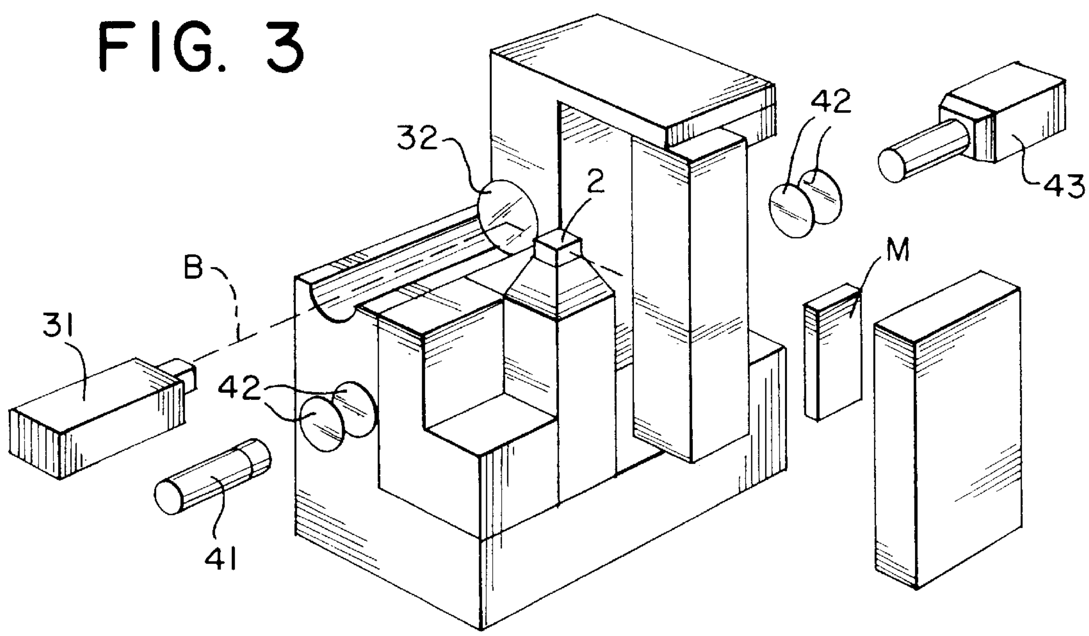
FIG. 3 is a simplified perspective view of an experimental arrangement used for confirming the operation of the molding unit in accordance with the present invention.

FIG. 3 depicts one example of the experimental arrangements which were used by the inventors to confirm the merits of the present invention. In the test, an injection machine MINIMAT 8/7 manufactured by Sumitomo Heavy Industries Co. was used for injection molding with an injection capacity of 4 $cm^3$. A $CO_2$ gas laser 31 of the maximum output 10 W was used for the radiation source with an infrared beam B of about 4 mm diameter. The infrared beam B was changed in direction by a reflective mirror 32 for radiation onto molten polymer material in the molding unit past an infrared transmissible panel 2 made of zinc selenide and attached to the mold unit. Polystyrene US 320 supplied by Idemitsu Petrochemical Co. was used for the polymer material to be tested. For observation of the state of strain within the polymer material, a photoelastic system was utilized, which included an interference light source 41, polarization plates 42 and a monitoring camera 43. The injection temperature was in a range from 200° to 250° C., the injection speed was about 30 mm/sec within the mold unit, and the injection pressure was 25 MPa. Different from general cooling by water, natural cooling by air was employed for the tests because of the relatively few production cycle par unit period.

Figure 4:
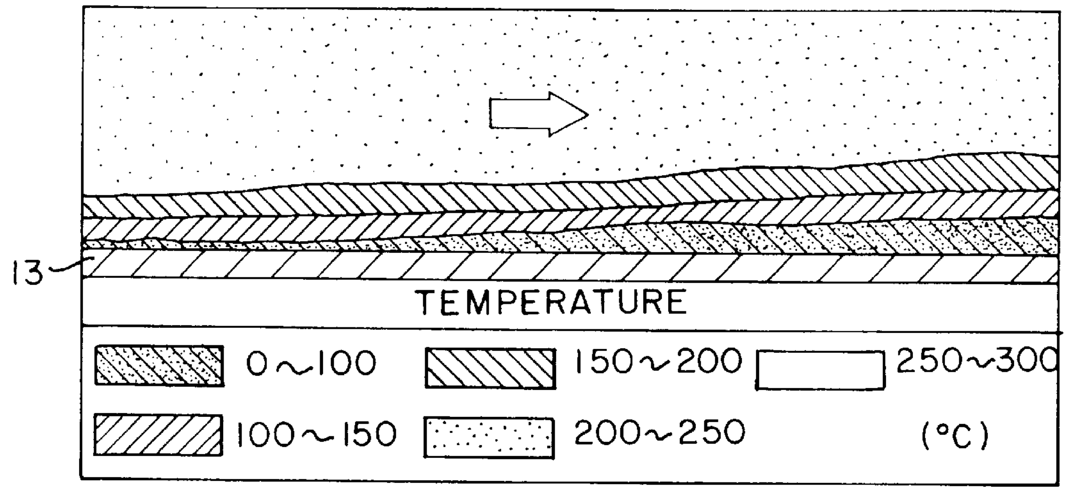
FIG. 4 is a graphical representation for showing thermal distribution within molten polymer material and a shaping mold of the convent-system wherein no infrare radiation is employed.
Figure 5:
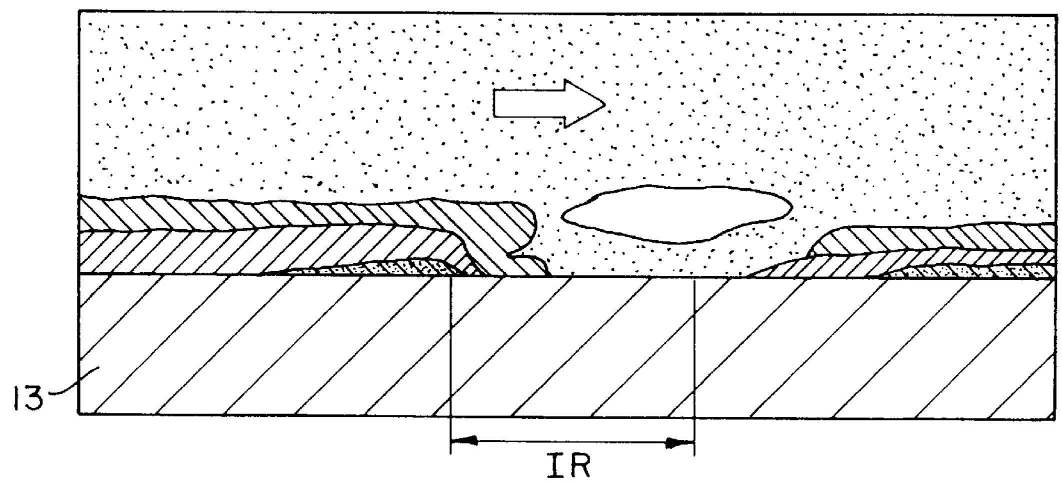
FIG. 5 is a graphical representation for showing thermal distribution within molten polymer material and a shaping mold of the system of the present invention wherein infrared radiation is employed.

Examples of the state of thermal distribution of the molten polymer material within the mold unit are shown in FIGS. 4 and 5, in each of which flow direction of the molten polymer material is shown with an arrow.

FIG. 4 shows the thermal distribution without any infrared radiation (the conventional system). It is clearly observed in the drawing that polymer layers of different temperatures are present in the vicinity of the mold wall (the second mold half 13). From this observation, it is well understood that solidified polymer layers of different viscosities have experienced molecular orientation in the vicinity of the mold wall. Stated otherwise, deviation of optical properties is present in the area near the mold wall. The temperature of the polymer material adjacent to the mold wall is very low and close to that of the shaping mold (0° to 100° C.). and its viscosity is extremely high. That is to say, the shape transcribability in polymer injection molding is significantly low in this area.

FIG. 5 depicts the thermal distribution when infrared radiation is employed in accordance with the present invention. The area indicated as “IR” was subjected to infrared radiation. It is clearly observed in the drawing that, within the area of infrared radiation, there is no substantial difference in temperature of the polymer material between an area near the mold wall and an area located near the center of the mold cavity. That is, the common temperature is in a range from 200° to 250° C. This result indicates the fact that no polymer layers of different temperatures are present in the vicinity of the mold wall. No substantial molecular orientation started in the area of infrared radiation and the obtained mold product suffers no substantial deviation of optical properties. In addition to absence of substantial difference in temperature of the polymer material in the area of infrared radiation, the temperature of the polymer material near the mold wall is locally higher (250° to 300° C.) than that of the polymer material located near the center of the mold cavity. Consequently, the polymer material in this local area is very low in viscosity and, as a consequence, assures high degree of shape transcribability in polymer injection molding.

Figure 7:
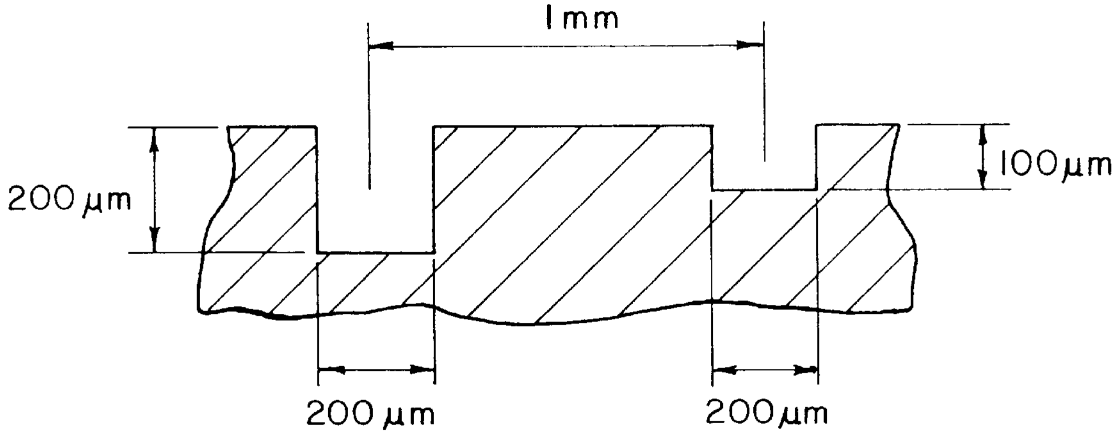
FIG. 7 shows a section taken along a line 7—7 in FIG. 6.

The influence of infrared radiation on the shape transcribability was studied using the experimental arrangement in which an infrared transmissible panel 2 is attached to a part of the second mold half 13 remote from the injection port (see FIG. 1). The degree of shape transcribability was evaluated for polymer injection moldings with and without infrared radiation. As shown in FIG. 7, the infrared transmissible panel 2 was provided in its surface facing the mold cavity with two types of grooves of different depths, i.e. one is 100 μm and the other 200 μm. Only one groove for each type is illustrated in the drawing. The width was 200 μm for both of the types. It was intended to form a pair of juxtaposed, elongated projections on a shaped mold product from these paired grooves. Zinc selenide was used for the panel 2, polystyrene was used for polymer injection molding, and a $CO_2$ gas laser was used for infrared radiation. In FIG. 6, molten polymer material was injected in the direction of an arrow.

Figure 8:
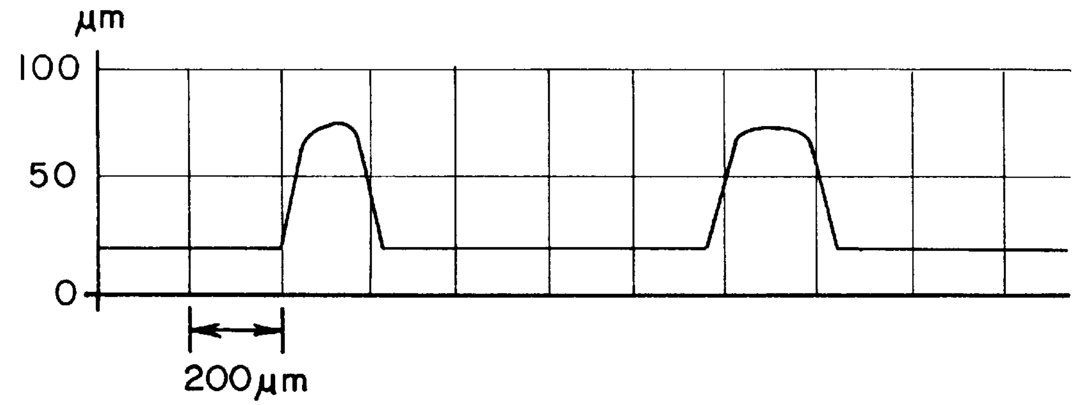
FIG. 8 is an SEM photographical representation for showing the experimental results of shape transcribability tests by the conventional system.
Figure 9:
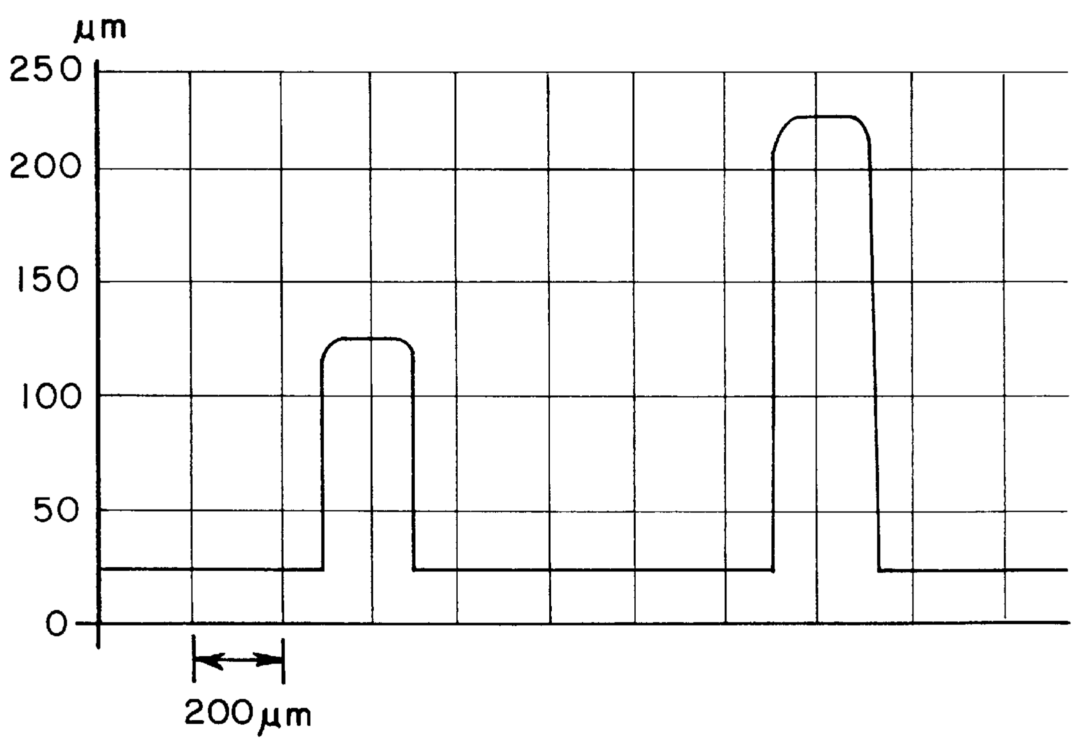
FIG. 9 is an SEM photographical representation for showing the experimental results of shape transcribability tests by the system of the present invention.

FIGS. 8 and 9 depict SEM photographic representations of the transcription height of projections reproduced on shaped molded products in the test conducted. Here, the transcription height can be interpreted as a transcription depth in the case of depressions in the mold wall. In each illustration, the abscissa corresponds to a direction transverse the grooves shown in FIG. 7, whereas the ordinate corresponds to the transcription height. One scale on the ordinate corresponds to 50 μm and one scale on the abscissa corresponds to 200 μm.

The experimental result without infrared radiation is shown in FIG. 8 in which the transcription height ranks about 50 μm for the respective grooves shown in FIG. 7. This result clearly indicates the fact that, under general conventional process condition of polymer injection molding without infrared radiation, the molten polymer material cannot fully intrude into the grooves formed in the mold wall and, as a consequence, the shapes of projections formed on the shaped mold product do not finely copy those of the grooves in the mold wall. Stated otherwise, shape transcription can not be carried out with complete fidelity.

FIG. 9 shows the experimental result with infrared radiation in accordance with the present invention. The transcription height is about 100 μm for the shallower groove and about 200 μm for deeper groove in FIG. 7. It is clear from this experimental result that the molten polymer material can sufficiently intrude into grooves formed in the mold wall and, as a consequence, the shapes of the grooves in the mold wall are well carried over projections on the shaped mold product. Thus, shape transcription can be carried out with appreciable fidelity when infrared radiation is employed in accordance with the present invention.

Influence of the infrared radiation on optical properties of shaped molded product was studied using a strip shown in FIG. 10. A part of a shaped molded product was sampled with a shape shown in FIG. 11 for evaluation of residual birefringence distribution. In the illustration, the area indicated as "IR" was subjected to infrared radiation in accordance with the present invention. Evaluation was carried out at three points A, B and C in FIG. 11. Only the point C is included in the area of infrared radiation.

Figure 12:
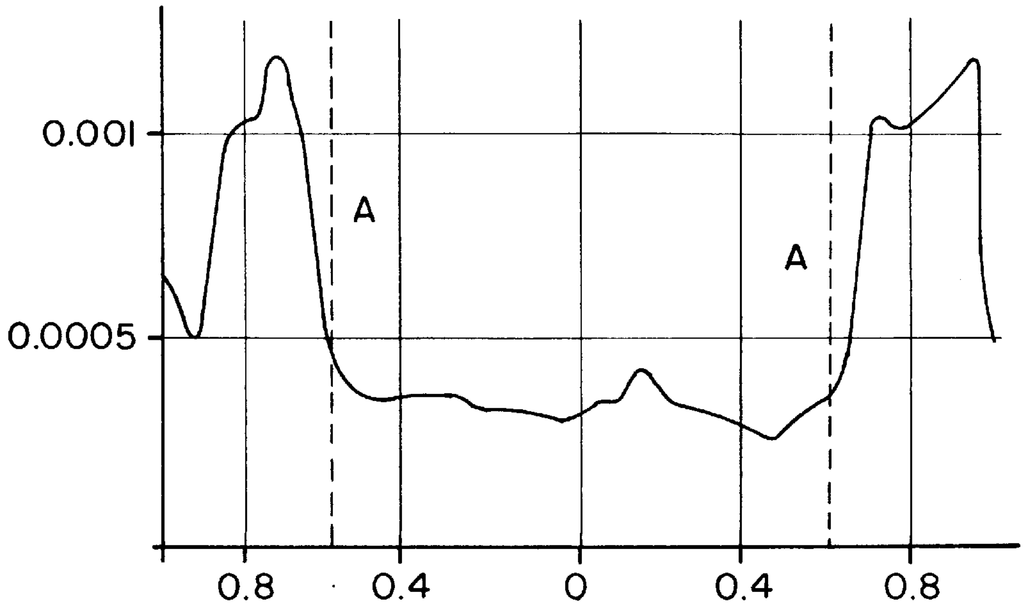
FIG. 12 is a graphical representation for showing the experimental results of residual birefringence test by the conventional system.
Figure 13:
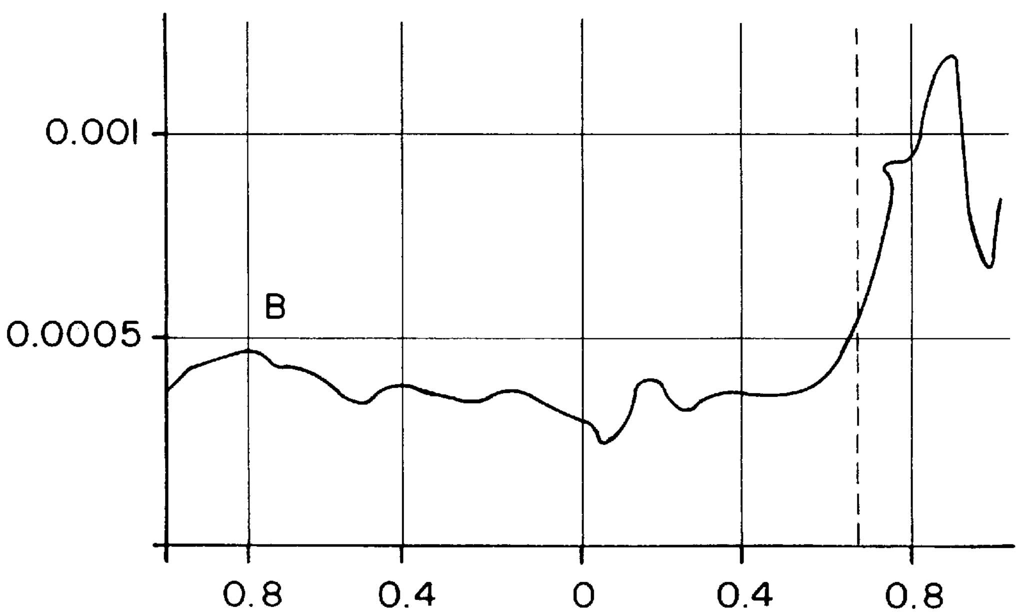
FIG. 13 is a graphical representation for showing the experimental results of residual birefringence tests by the system of the present invention.
Figure 14:
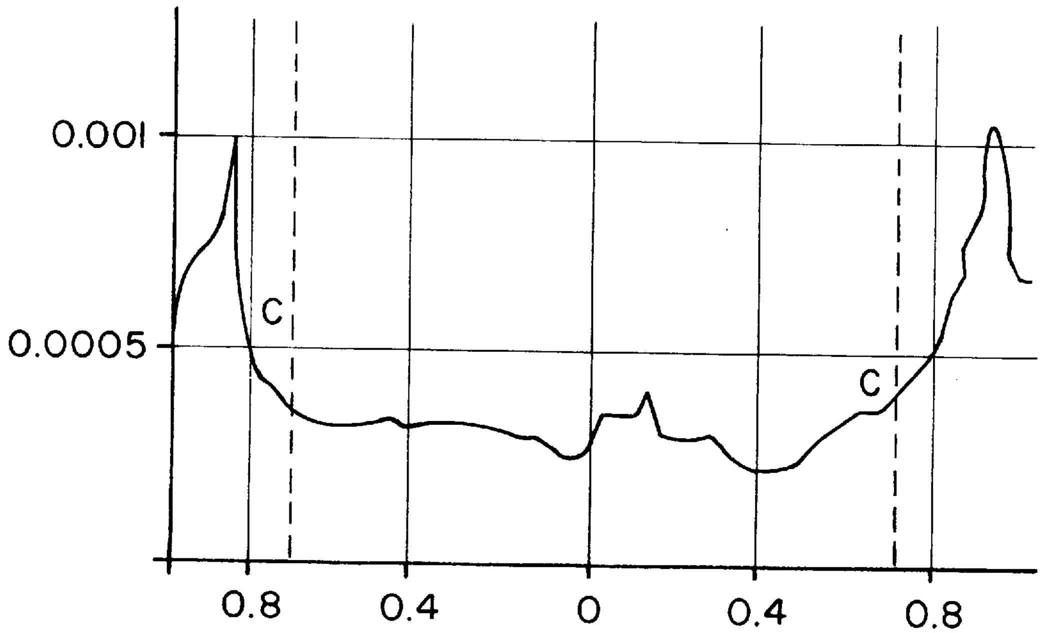
FIG. 14 is a graphical representation for showing the experimental results of residual birefringence tests in areas wherein no infrared radiation was applied.

The experimental results are shown in FIGS. 12 to 14, respectively. FIG. 14 indicates the remote location from the injection port, and FIG. 12 indicates the location close to the injection port. Infrared bean was radiated from left to right in FIG. 13. At the points A and C shown in FIG. 12 and 14, peaks are present on curves in an area close to the mold wall to endorse generation of deviation of optical properties due to molecular orientation. That is, the shaped mold product includes molecular orientation layers in areas corresponding to these peaks on the curves. In contrast to this, no substantial peak is present on a curve at the point B subjected to infrared radiation as shown in FIG. 13. It is clearly confirmed that the shaped mold product includes no substantial orientation layer and is provided with uniform optical properties. Apparently, no substantial molecular orientation occurred during polymer injection molding with infrared radiation.

Figure 15:
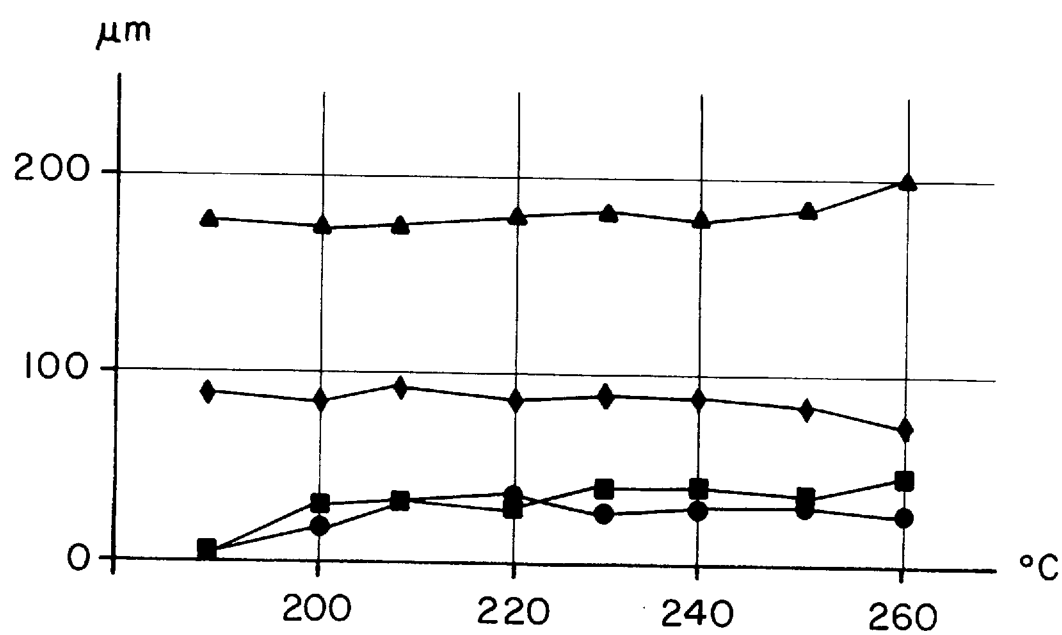
FIG. 15 is a graphical representation for showing a relationship between the temperature of molten polymer material and shape transcribability.
Figure 16:
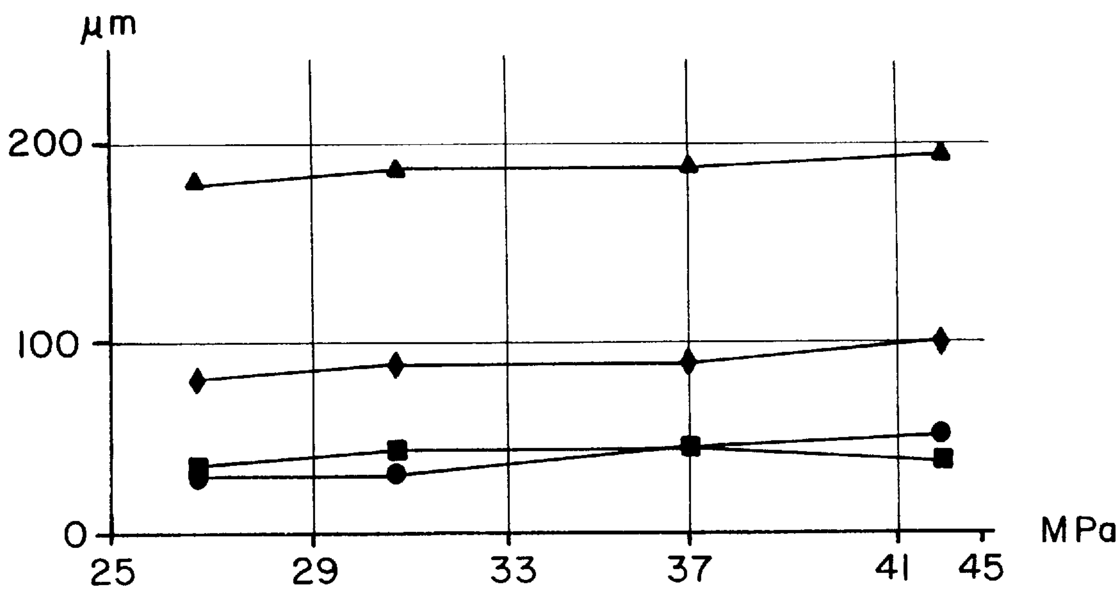
FIG. 16 is a graphical representation for showing a relationship between the injection pressure and shape transcribability.
Figure 17:
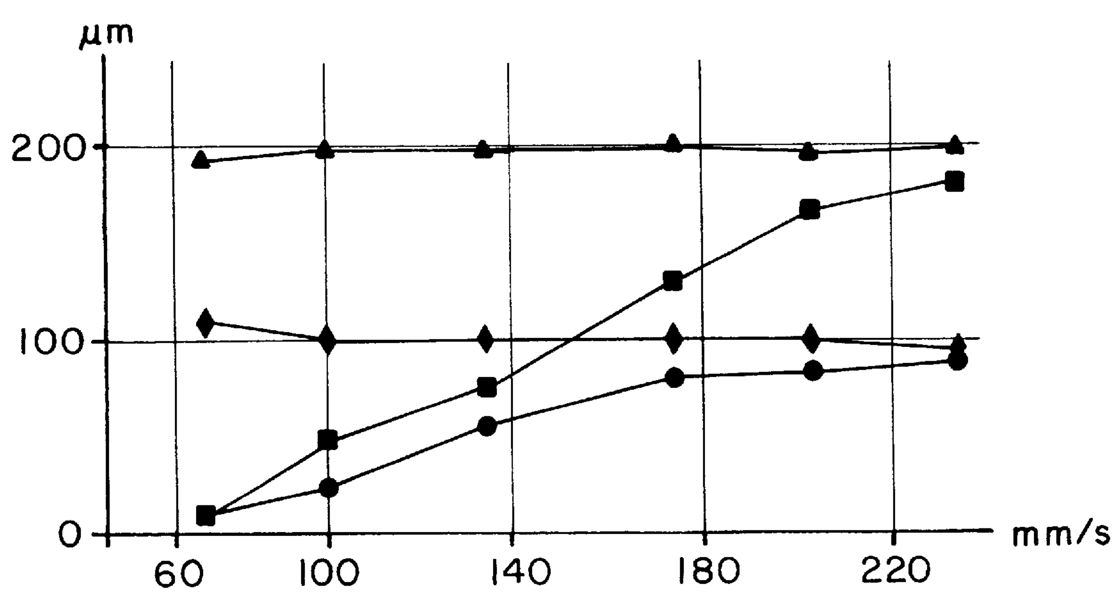
FIG. 17 is a graphical representation for showing a relationship between the injection speed and shape transcribability.

Further tests were conducted by the inventors in order to investigate influence of various molding parameters on shape transcribability and the experimental results are shown in FIGS. 15 to 17. In the illustration, transcription height in μm is taken on the ordinate. A curve marked with dark squares (■) corresponds to no infrared radiation with a groove of 200 μm depth, a curve marked with dark circles (●) corresponds to no infrared radiation with a groove of 100 μm depth, a curve marked with dark triangles (▲) corresponds to infrared radiation with a groove of 200 μm depth and a curve marked with dark diamond (♦) corresponds to infrared radiation with a groove of 100 μm depth.

The influence of the temperature of molten material on shape transcribability is shown in FIG. 15 in which the temperature is taken on the abscissa and the depth of the groove on the ordinate. It is clearly observed that change in temperature poses no substantial influence on shape transcribability. A great difference in shape transcribability is present between the conventional system and the present invention.

The influence of injection pressure on shape transcribability is shown in FIG. 16 in which the injection pressure is taken on the abscissa and the depth of the groove on the ordinate. It is also clearly noted that change in injection pressure has no substantial influence on shape transcribability. Here again, a great difference in shape transcribability is present between the conventional system and the present invention.

FIG. 17 depicts the influence of injection speed on shape transcribability. In the case of the conventional system, increase in injection speed significantly improves the shape transcribability. Increase in injection speed, however, tends to generate sharing stress in the area near the mold wall and, as a consequence, induces molecular orientation which impairs optical properties of shaped mold product.

In accordance with the present invention, the viscosity molten polymer material is lowered in particular in the low transcription of a mold wall to much enhance shape transcribability even when the mold wall has a complicated fine shape. Highly precise reproduction of the shape on mold products can be achieved.

Further lowering in viscosity of molten polymer material near the mold wall suppresses molecular orientation during injection molding, thereby successfully avoiding formation of undesirable orientation layers. Resultant shaped mold products exhibit uniform optical properties.

Since no heating of the shaping mold is needed, the inherent cooling function of the system is effectively utilized, thereby maintaining the high grade productivity special to the polymer injection molding.

We claim:

1. A polymer injection molding unit comprising:

a metallic mold provided with mold walls defining a mold cavity, at least one low transcription area present on said mold walls and made of an infrared transmissible material without substantial energy absorption, and an external infrared radiation source attached to said metallic mold in an arrangement to radiate a polymer material in the vicinity of said low transcription area during polymer injection molding to thereby affect the temperature of said polymer material without substantially affecting the temperature of said infrared transmissible material.

2. A polymer injection molding unit as claimed in claim 1 in which said infrared transmissible material is selected from a group consisting of zinc selenide, sapphire and infrared glass.

3. A polymer injection molding unit as claimed in claim 1 in which said external radiation source is selected from a group consisting of a $CO_2$ gas laser, a YAG laser and an infrared lamp.

* * * * *